United States Patent
Fliess et al.

(10) Patent No.: US 11,388,696 B2
(45) Date of Patent: Jul. 12, 2022

(54) BROADCAST CHANNEL RECEPTION IN NB-IOT DEVICES

(71) Applicant: Shenzhen Goodix Technology Co., Ltd., Guangdong (CN)

(72) Inventors: Thomas Fliess, Dresden (DE); Chethan Venkatesan, Dresden (DE)

(73) Assignee: Shenzhen Goodix Technology Co., Ltd., Shenzhen (CN)

( * ) Notice: Subject to any disclaimer, the term of this patent is extended or adjusted under 35 U.S.C. 154(b) by 86 days.

(21) Appl. No.: 17/014,199

(22) Filed: Sep. 8, 2020

(65) Prior Publication Data
US 2020/0404622 A1  Dec. 24, 2020

Related U.S. Application Data

(63) Continuation of application No. PCT/EP2018/069122, filed on Jul. 13, 2018.

(51) Int. Cl.
*H04W 56/00* (2009.01)
*H04W 72/00* (2009.01)
(Continued)

(52) U.S. Cl.
CPC ......... *H04W 72/005* (2013.01); *H04L 1/0013* (2013.01); *H04L 1/1642* (2013.01);
(Continued)

(58) Field of Classification Search
CPC . H04W 72/005; H04W 4/80; H04W 72/0446; H04W 72/0466; H04L 1/0013; H04L 1/1642
(Continued)

(56) References Cited

U.S. PATENT DOCUMENTS

| 2008/0316995 | A1  | 12/2008 | Bachu et al. |
| 2012/0099663 | A1  | 4/2012  | Sabol |
| 2018/0091173 | A1* | 3/2018  | Axmon ............ H03M 13/6306 |

FOREIGN PATENT DOCUMENTS

| CN | 107528671 A | 12/2017 |
| CN | 107925499 A | 4/2018 |

(Continued)

OTHER PUBLICATIONS

European Search Report dated Mar. 7, 2018 of corresponding European application No. 18150961; 1 page.
(Continued)

*Primary Examiner* — Sai Ming Chan
(74) *Attorney, Agent, or Firm* — Maier & Maier, PLLC (57) ABSTRACT

A method for improving reliability of a narrowband physical broadcast channel (NPBCH) reception in narrowband internet-of-things (NB-IoT) user equipment (UE) during a cell acquisition phase. An object is to improve the existing NPBCH reception procedure in order to achieve a lower code-rate and hence a more reliable transmission between eNodeB and UEs will be solved thereby that the UE receives, descrambles and de-rate-matches at least a first and a second group of 64 NPBCH subframes, whereas using the four most significant bits of the system frame number as a counter and a modifier sequence {m}, which is applied to the first group of 64 NPBCH subframes, before combining the both groups, decoding and extracting the master information block from the combined NPBCH subframes and whereas the UE attaches to the cell if a match is found.

20 Claims, 4 Drawing Sheets

(51) Int. Cl.
| | |
|---|---|
| *H04W 4/80* | (2018.01) |
| *H04L 1/00* | (2006.01) |
| *H04L 1/16* | (2006.01) |
| *H04W 72/04* | (2009.01) |

(52) U.S. Cl.
CPC ......... *H04W 4/80* (2018.02); *H04W 72/0446* (2013.01); *H04W 72/0466* (2013.01)

(58) Field of Classification Search
USPC .......................................................... 370/329
See application file for complete search history.

(56) References Cited

FOREIGN PATENT DOCUMENTS

| EP | 3282769 A2 | 2/2018 |
|---|---|---|
| EP | 3 349 380 A1 | 7/2018 |
| WO | 2018085660 A1 | 5/2018 |

OTHER PUBLICATIONS

International Search Report dated Mar. 20, 2019 in corresponding International application No. PCT/EP2018/069122; 4 pages.

Ericsson: "On MIB-NB and SIB1-NB Acquisition Time Reduction", 3GPP Draft; RI-1717020 On MIB-NB and SIB1-NB Acquisition Time Reduction, 3rd Generation Partnership Project (3GPP), Mobile Competence Centre; 650, Route Des Lucioles; F-06921 Sophia-Antipolis Cedex, vol. RAN-WG1, No. Prague, Czech Republic; Oct. 9, 2017-Oct. 13, 2017 , Oct. 8, 2017, Retrieved from the Internet: URL:http://www.3gpp.org/ftp/Meetings_3GPP_SYNC/RAN1/Docs/ [retrieved on Oct. 8, 2017] , 10 pgs.

Ericsson: "On system acquisition time reduction", 3GPP Draft; RI-1705188—On System Acquisition Time Reduction, 3rd Generation Partnership Project (3GPP), Mobile Competence Centre ; 650, Route Des Lucioles; F-06921 Sophia-Antipolis Cedex; France, vol. RAN WG1, No. Spokane, Washington, USA; Apr. 3, 2017-Apr. 7, 2017, Apr. 2017 (Apr. 2, 2017), Retrieved from the Internet: URL:http://www.3gpp.org/ftp/Meetings -3GPP -SYNC/RAN1/Docs/ [retrieved on Apr. 2, 2017] , 7 pgs.

Ratasuk Rapeepat et al: "Overview of narrowband IoT in LTE Rel-13", 2016 IEEE Conference on Standards for Communications and Networking (CSCN), IEEE, Oct. 31, 2016 (Oct. 31, 2016), pp. 1-7, DOI: 10.1109/CSCN.2016.7785170 [retrieved on Dec. 15, 2016] , 3 pgs.

Office Action dated Jan. 18, 2022, in connection with corresponding Chinese Application No. 201880088424.4; 9 pages.

* cited by examiner

BROADCAST CHANNEL RECEPTION IN NB-IOT DEVICES

CROSS-REFERENCES TO RELATED APPLICATIONS

This application is a continuation of International Application No. PCT/EP2018/069122, filed on Jul. 13, 2018, the disclosure of which is hereby incorporated by reference in its entirety.

TECHNICAL FIELD

The present disclosure discloses a method for improving reliability of a narrowband physical broadcast channel (NPBCH) reception in narrowband internet-of-things (NB-IoT) user equipment (UE) during a cell acquisition phase, whereas the UE receives one group of 64 encoded NPBCH subframes in order to attach itself to the cell, whereas the one group of 64 NPBCH subframes comprises a master information block (MIB) comprising cell configuration and cell time information and four most significant bits of a system frame number, and whereas the most significant bits of the system frame number are incremented every 64 NPBCH subframes.

BACKGROUND

New markets and techniques for e.g. internet-of-things (IoT) are currently developed; new applications like automatic meter reading from the outside of buildings via cellular networks emerge.

On the one hand, such applications demand increase in coverage of the cellular networks. The coverage of a network defines the geographical area where the base stations of a network can communicate with user equipment (UE). The network is distributed over land areas called cells, each served by at least one fixed-location transceiver, but more normally three cell sites or base stations. These base stations provide the cell with the network coverage which can be used for transmission of voice, data and others. A cell typically uses a different set of frequencies or codes from neighboring cells, to avoid or mitigate interference and provide guaranteed service quality within each cell. On the other hand, network operators are not willing to spend too much frequency spectrum as highly valuable resource and device manufacturers want to reduce cost for such IoT devices which are produced in potentially high volumes.

To meet these requirements, narrow-band IoT (NB-IoT) standard is currently being developed as a derivative of the long-term evolution (LTE) standard where the maximum bandwidth is very small compared to other cellular systems.

To achieve high coverage while being constraint by heavy limitations of the system bandwidth, repetition and combining is widely deployed throughout NB-IoT standard. Repetition and combining is a widely-used technique where signals or information are repeated on the transmitter side. This allows the receiver to combine received signals or information to obtain a more reliable result, e.g. during detection of a signal or decoding of information conveyed in a certain channel.

A characteristic of transmissions with repetitions is so-called code-rate, i.e. the ratio of number of information bits per transmission and the number of channel bits being transmitted. Information bits are understood as bits carrying basic information about the cell configuration. Channel bits are understood as bits carrying information in encoded form which are then mapped to a physical channel using a known modulation scheme like quadrature phase shift keying (QPSK). The lower the code-rate gets the more reliable the transmission becomes. The reason is that the more information is repeated the more likely it becomes that the recipient can correctly receive the information.

In state-of-the-art cellular communication systems, base stations (eNB) of the network broadcast various signals and channels that allow end user devices (UE) to detect the presence of a cell and to obtain basic information about the cell configuration before attaching to this cell.

In NB-IoT standard, presence of the cell as well as first cell parameters are signaled in NB primary synchronization channel (NPSS) and secondary synchronization channel (NSSS). Both channels possess known lengths and fixed, rather short transmission periodicity. The NPSS is used by the devices to achieve synchronization, in both time and frequency, to an NB-IoT cell.

In a first step, the UE acquires these channels (NPSS and NSSS) to synchronize to the cell. Both channels are designed such that received signals from individual transmissions can be combined over an arbitrary number of periods, even in practical realizations. In practical realizations mean, that the user expects a search result or a response after some time and "arbitrary" mean "infinite", in the sense that a device would combine forever and would not come back with a result. It may also be the case that higher layer time-out settings limit the maximum available time. The reliability of UE synchronization is limited by design, which means that some limitations may apply already due to 3GPP definition. In the state-of-the-art, the same information is only sent 64 times, then the UE cannot combine more than that, combining is limited by design.

Figure 1:
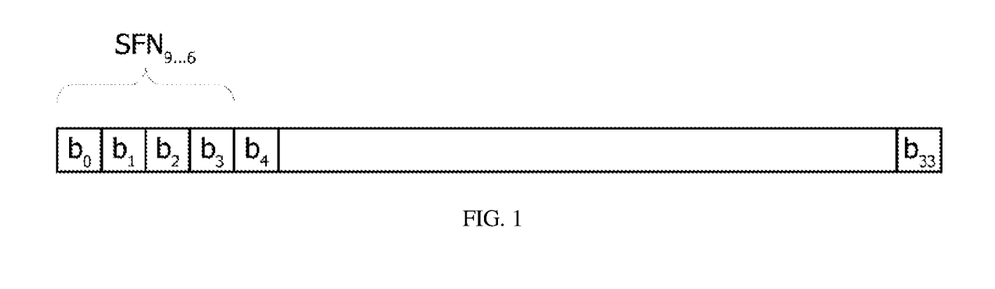
FIG. 1 The master information block with the four most significant bits as system frame counter.
Figure 2:
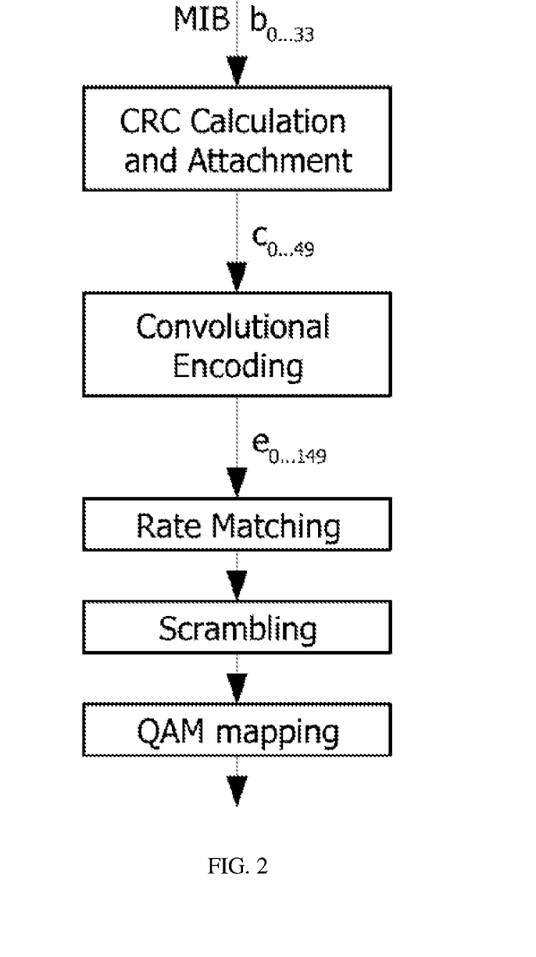
FIG. 2 Procedure for processing the NPBCH on transmitter side.

In a next step, the UE has to receive and decode the NB physical broadcast channel (NPBCH). The NPBCH is QPSK modulated and carries narrowband master information block MIB-NB information. The MIB comprises of various cell configuration and some cell time information in the form of a set of bits, meaning it contains 34 bits (FIG. 1) and is transmitted over 64 frames. The MIB-NB is split into 8 blocks, where each block is transmitted on the first subframe (SF #0) in a frame and is repeated in the subsequent 7 frames. It also comprises four most significant bits of the system frame number (SFN). The system frame number is considered as the index of a system frame, i.e. part of the logical cell time.

NPBCH is periodically sent by the base station (eNB) in 1 out of 10 subframes per system frame as stated above. NPBCH subframes are repeated 8 times, whereas information bits remain unchanged for 64 consecutive transmissions, hence over 640 ms transmission time interval (TTI). Using a limited number of hypotheses, the UE can combine these 8 blocks with 8 individual transmissions each to decode the master information block. Hypotheses are assumptions about the actual cell timing which is not entirely known at this stage. The resulting code-rate is $1/256 \sim 4*10^{-3}$, meaning that 256 channel bits in relation to one information bit are transmitted per transmission. Further combining, i.e. beyond 64 consecutive NPBCH subframes is not foreseen since the SFN bits in MIB change after 64 SFN.

Other transmissions between eNodeB and UE, for instance, unicast transmissions, i.e. data transmission dedicated to the individual UE, can be configured with a code-rate of down to $4*10^{-5}$ which is significantly more reliable than NPBCH reception. Consequently, the performance of the entire system may be limited by NPBCH reception performance.

From the 3GPP standard it is known, that in an NB IoT network, a UE must synchronize to a cell and acquire basic system information before it can attach to that cell. A part of the system acquisition procedure is the reception of the Narrowband physical broadcast channel (NPBCH). The master information block (MIB) as NPBCH payload is 34 bits long and carries, among other configuration parameters, the 4 most significant bits (MSBs) of SFN as the first 4 bits $b_0 \ldots b_3$ of MIB.

Per 3GPP 36.212 and 36.211, NPBCH is processed on transmitter side in following steps:

1. Calculation and attachment of 16 bit cyclic redundancy check (CRC), resulting in a bit sequence $\{c_i\} \rightarrow \{c_0 \ldots c_{49}\} = \{b_0 \ldots b_{33}, crc_0 \ldots crc_{15}\}$
2. Convolutional encoding with tail-biting, resulting in a bit sequence $\{e_i\} \rightarrow \{e_0 \ldots e_{149}\}$
3. Rate matching
4. Scrambling
5. Quadrature amplitude modulation (QAM) mapping These steps are explained in more detail.

The "CRC calculation" refers to a procedure where payload bits are fed into a shift register with linear feedback in order to create a checksum which can be used to determine correctness of the received data. This checksum is usually appended to the sequence of payload bits. CRC means cyclic redundancy check.

Figure 3:
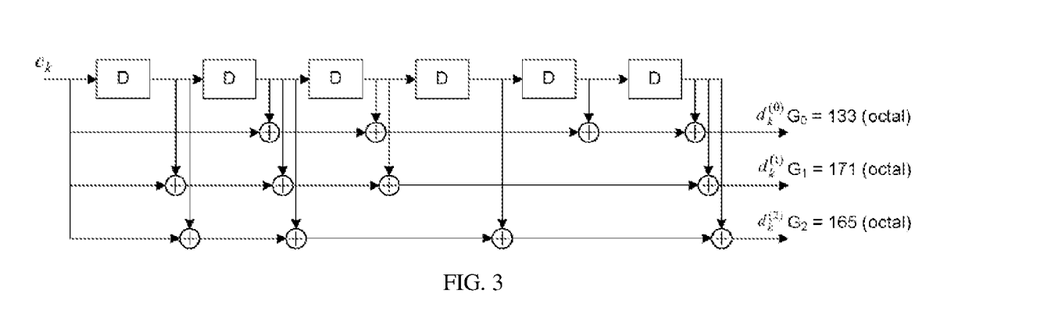
FIG. 3 Schematical illustration of the convolutional encoding.

The "Convolutional encoding" refers to encoding of payload data and attached CRC bits according to a linear scheme; this is illustrated in FIG. 3, respectively. Each D represents a delay of one bit, each ⊕ a xor-operation. Both operations are linear. For encoding of NPBCH and other channels in NB IoT, coding schemes with code-rate ⅓ are used, i.e. each input bit to the encoder creates 3 bits in the output of the encoder. This additional redundancy may be used at receiver side to compensate for channel distortions and errors in the received signal.

The "Rate matching" describes a procedure where the base code rate of the used code (in general ⅓) is adapted to the desired amount of redundancy, i.e. the level of protection of the transmitted signal. Furthermore, rate matching is used to adapt the encoder output bit stream to the number of available resources given by the structure of the transmitted signal in a fine-granular fashion. During the rate matching procedure, individual bits are either repeated or omitted while assembling the output bit stream, to get a higher or lower amount of redundancy, respectively. Furthermore, rate matching in NB IoT involves some interleaving, i.e. exchange of bit positions to improve diversity. All operations are linear. On receiver side, so called de-rate matching involves combination of bits that have been repeatedly transmitted or filling of bit positions that have been omitted in the actual transmission with zero information.

The "Scrambling" describes a procedure where a locally generated pseudo-random bit sequence is applied to an input bit stream by a bit-wise xor-operation. This improves the statistics of the transmitted signal since long sequences of '0' or '1' are avoided. Furthermore, interference from or to other transmission links becomes more noise-like, improving the ability to cope with such interferences during decoding.

Both, transmitter and receiver apply the same pseudo-random sequence, which depends on the chosen hypotheses, the xor operation itself is linear.

In order to allow for reception of NPBCH under extreme conditions (e.g. high attenuation in basements of buildings), various kinds of repetition are performed which a UE may collect and combine to successfully decode the basic cell information conveyed in NPBCH.

The UE receives signals that consist of inner repetitions of exactly the same bit stream and outer repetitions with the same NPBCH payload but different scrambling pattern. In the 3GPP standard the number of inner repetitions is 8. Eight outer repetitions with 8 inner repetitions each yield that the same MIB as payload of NPBCH is repeated 64 times in total, with different rate matching and scrambling pattern on NPBCH every 8th NPBCH subframe.

In practical scenarios, only the beginning of an inner repetition sequence is known in advance. A UE has to test up to 8 different hypotheses to obtain correct position of outer repetitions and a constructive combination of all received repetitions.

Figure 4:
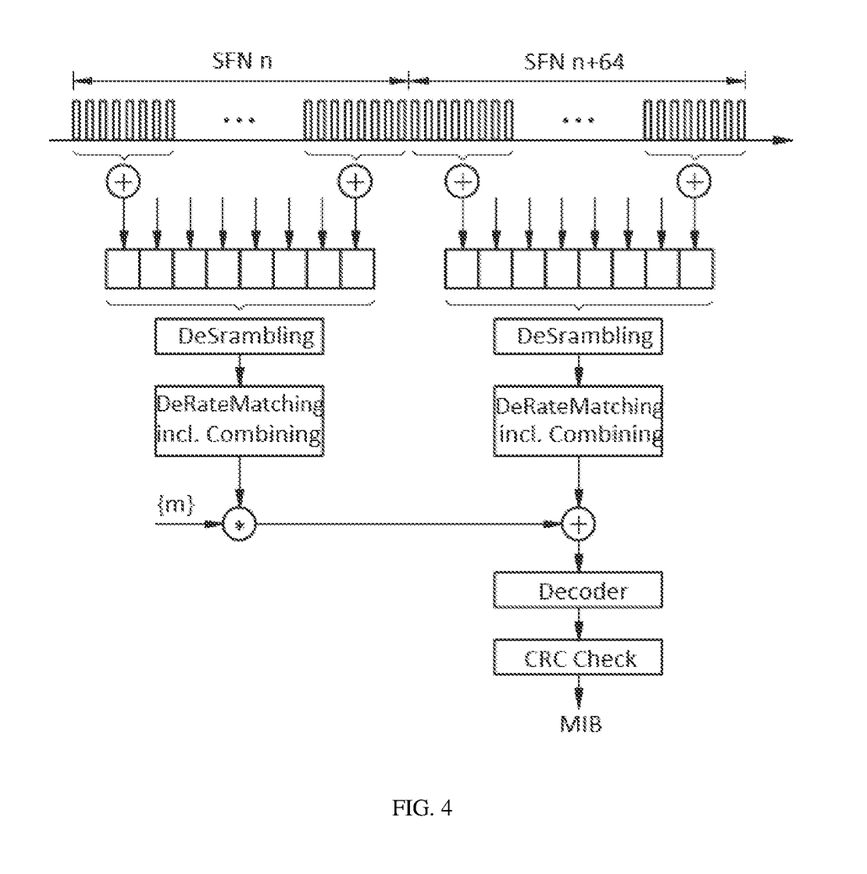
FIG. 4 Combining of 64 subframes of one received group of NBPCH subframes with correct timing hypothesis (state-of-the-art)

State-of-the-art UEs make use of the inner repetitions as well as of the known rate matching and scrambling hypotheses to combine all 64 subframes before decoding. This is exemplary shown in FIG. 4.

The encoded signals from the transmitter side (usually a base station) have to be received and decoded by a UE, therein that the UE can reliably decide if it can attach to that cell of the base station or not.

SUMMARY

It is an object of the present disclosure to improve the existing NPBCH reception procedure in order to achieve a lower code-rate and hence a more reliable transmission between eNodeB and UEs.

The object of the present disclosure will be solved by a method for improving reliability of a broadcast channel (NPBCH) reception in narrowband internet-of-things (NB-IoT) devices (UE) during a cell acquisition phase, whereas the UE receives, descrambles and de-rate-matches at least a first and a second group of 64 NPBCH subframes, whereas using the four most significant bits of the system frame number as a counter and a modifier sequence {m}, which is applied to the first group of 64 NPBCH subframes, before combining the both groups, decoding and extracting the master information block from the combined NPBCH subframes and whereas the UE attaches to the cell if a match is found.

The 4 most significant bits of the system frame number (SFN) conveyed in the master information block (MIB) (see FIG. 1) can be considered as a counter which gets incremented every 64 NBPCH subframes. Whenever this counter is incremented from an odd to an even number, it is not known which bits will change without knowledge of the actual SFN. However, for all occasions where the counter gets incremented from an even to an odd number, the lowest significant bit (LSB) of the counter changes from 0 to 1. All other transmitted bit remains unchanged.

With the knowledge that the master information block (MIB) as NPBCH payload information is protected by 16 cyclic redundancy check (CRC) bits and since the position of the SFN bits and length of MIB are known, the impact of a single bit toggle on CRC bits is well-determined. From the change of LSB and the corresponding CRC change, the resulting change of the output of convolutional encoder can be determined as well. This is independent of the actual MIB content.

This pattern is translated into a modifier sequence {m} which is applied to one group of 64 NPBCH subframes to enable the constructive combination with the next group of received 64 NPBCH subframes. Thus, 128 consecutive NPBCH receptions can be combined instead of 64.

The advantage of the inventive method is that 128 instead of 64 NPBCH subframes can be collected and constructively combined to obtain cell configuration and timing information during cell acquisition phase. This yields a coverage improvement by 3 dB with respect to NPBCH/MIB reception.

The proposed method and hence the combining scheme of fixed bit sequences of encoded information can be used during reception of any kind of broadcast information where cell configuration information remains constant most of the time but the straight-forward combining of sequential transmissions is limited due to inclusion of cell time information in the broadcasted information. Pre-requisite is that a modifier vector exists which be calculated in advance, i.e. without knowledge of the actual information. Examples for such broadcast information are the system information block 1 (SIB1) in NB IoT and the PBCH in LTE standard.

So, more generally, the inventive method can be summarized that a method for improving reliability of encoded broadcasted cell configuration information reception in a communication standard is disclosed, whereas a straight-forward combining of sequential transmissions is limited due to inclusion of cell time information in broadcasted information, the inventive method combines two consecutive blocks of NPBCH where the broadcasted MIBs differ by a single increment in the part of the MIB code word that signals cell timing. In order to constructively combine NPBCH of two consecutive MIBs the inventive method uses a modifier vector which is calculated in advance without knowledge of an actual information by encoding a MIB that contains all zeros but a single one at the position of the least significant bit of the cell timing information in the MIB.

In a preferred embodiment of the inventive method, the MIB code word which has a standardized form of 34 bits ($b_0 \ldots b_{33}$) length, whereas the four most significant bits ($b_0 \ldots b_3$) are defined as four most significant bits of the system frame number used as the counter, whereas whenever the counter gets incremented from an even to an odd number, only the lowest significant bit of the counter $b_3$ changes from 0 to 1, resulting in only one bit toggle.

This bit toggle is implemented in the modifier sequence $\{m\}$ as explained above, and hence allows combining 128 NBPCH subframes instead of 64 NBPCH subframes.

With the inventive method it is possible that a device decides itself how many combinations are sufficient. So, the reliability of UE synchronization is not limited by design, in contrast to the state-of-the-art, where the same information is only sent 64 times, then the UE cannot combine more than that, combining is limited by design. Thus, without the solution of present disclosure the UE can decide in the range of 1 to 64 combinations, and with the solution of present disclosure in the range of 1 to 128 combinations. Hence the more combinations are used, the more reliable the synchronization of the UE becomes.

In another preferred embodiment of the inventive method, the modifier sequence $\{m\}$ is calculated in advance by using the one bit toggle in the SFN bits and whereas $\{m\}$ is fixed for a certain communication standard.

The sequence $\{m\}$ should be pre-calculated in advance since calculation during run-time does not give an advantage but causes higher complexity in the actual implementation and higher power consumption.

In an embodiment of the inventive method, the modifier sequence $\{m\}$ is calculated by performing the following steps:

feeding the MIB with the bits $b_1=0$ with $i=0 \ldots 33$ except for $b_3=1$ to a CRC calculation and attachment procedure, and performing a convolutional encoding procedure, resulting in a sequence $\{e\}$, mapping the sequence $\{e\}$ to the modifier sequence $\{m\}$ according to $\{m\}=(1-2*e_i)$ with $i=1 \ldots 33$.

In another embodiment of the inventive method, the modifier sequence $\{m\}$ is determined analytically using equations for encoding which are defined in the corresponding standards.

Corresponding standards mean that the determination is performed according to the restrictions and boundary condition of the standard in which the method will be performed.

During reception, immediate combining, descrambling and de-rate-matching is carried out for two independent blocks containing 64 NPBCH each. Then, the de-rate-matched output from the first block is multiplied with sequence $\{m\}$ and combined with de-rate-matched output of the second block. The result is provided to the decoder, CRC check is performed and if successful, information data are passed on the higher layers.

Since it is not known in advance whether the SFN MSBs counter has changed from even to odd or odd to even, it is preferred that the UE receives up to three groups of 64 NPBCH subframes, denoted as G(j) with j=0,1,2 in order to detect the bit toggle in the most significant bits of the system frame number between one of the two groups $\{G(0), G(1)\}$ or $\{G(1), G(2)\}$. As the MSBs of the system frame number is incremented every 64 subframes, one of the pairs $\{G(0), G(1)\}$ and $\{G(1), G(2)\}$ will exhibit the desired counter increment from an even to an odd number.

In another embodiment of the inventive method, the decoding of the modified first group of 64 NPBCH subframes is already performed during reception of the first group providing that the one bit toggle has been occurred. The combining across SFN+64 hypothesis is already considered during reception of the first group of 64 NPBCH subframes. Usually, the starting point of the group of 64 NPBCH subframes is not known in advance. A state-of-the-art UE receives 8 sets of 8 NPBCH subframes each and tries to decode the combined signal. If the decoding is not successful, the oldest set is discarded and a new set is received. This sliding window process is repeated until a match is found. Since start of reception is not synchronized with the start of transmission of a set of 8×8 NPBCH subframes, 12 sets must be received on average before a match is found.

A UE implementing the invented method will try up to 8 hypotheses on the first received 8 sets of 8 NPBCH subframes. Provided that counter in NPBCH code word changes from even to odd, one of the 8 trials will be successful. Hence, NPBCH can be successfully decoded already after reception of 8×8 NPBCH subframes which results in less power consumption.

The present disclosure will be explained in more detail using exemplary embodiments.

BRIEF DESCRIPTION OF DRAWINGS

The appended drawings show

DESCRIPTION OF EMBODIMENTS

Figure 5:
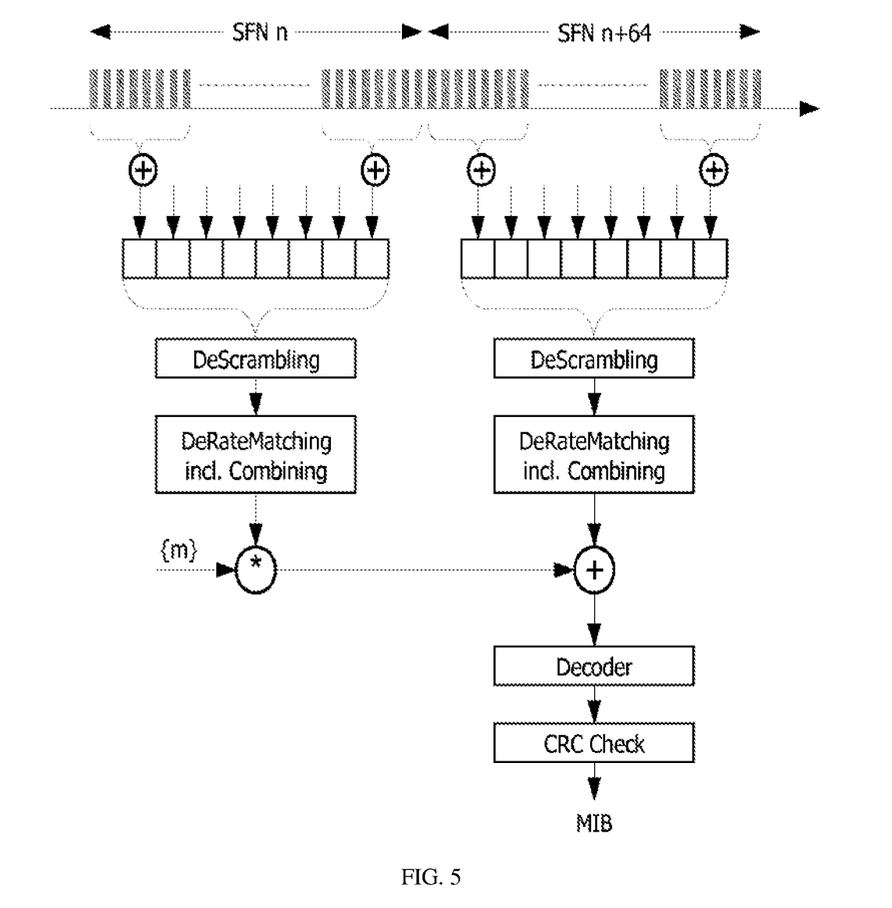
FIG. 5 Inventive method with modifier sequence {m} and decoding of 128 NPBCH subframes.

FIG. 5 shows the inventive method for improving reliability of a broadcast channel (NPBCH) reception in narrowband internet-of-things (NB-IoT) devices (UE) during a cell acquisition phase. During reception, immediate combining, descrambling and de-rate-matching is carried out for two independent blocks containing 64 NPBCH each. Then, the de-rate-matched output from the first block is multiplied with sequence {m} and combined with de-rate-matched output of the second block. The result is provided to the decoder and processed further as usual.

FIG. 5 depicts only the case where collection starts at the beginning of a NPBCH repetition period, with SFN mod 64=0 in MIB. Here, all received information can be constructively combined. Hence, the number of NPBCH transmissions which can be combined before decoding is increased by a factor of 2, i.e. from 64 to 128. This provides a theoretical performance gain of 3 dB or increase of cell reach by a factor of sqrt(2).

For practical scenarios where the exact timing of a NPBCH period is not known, worst case 15*8 additional NPBCH subframes must be received before the maximum number of constructive combinations is reached.

Figure 6:
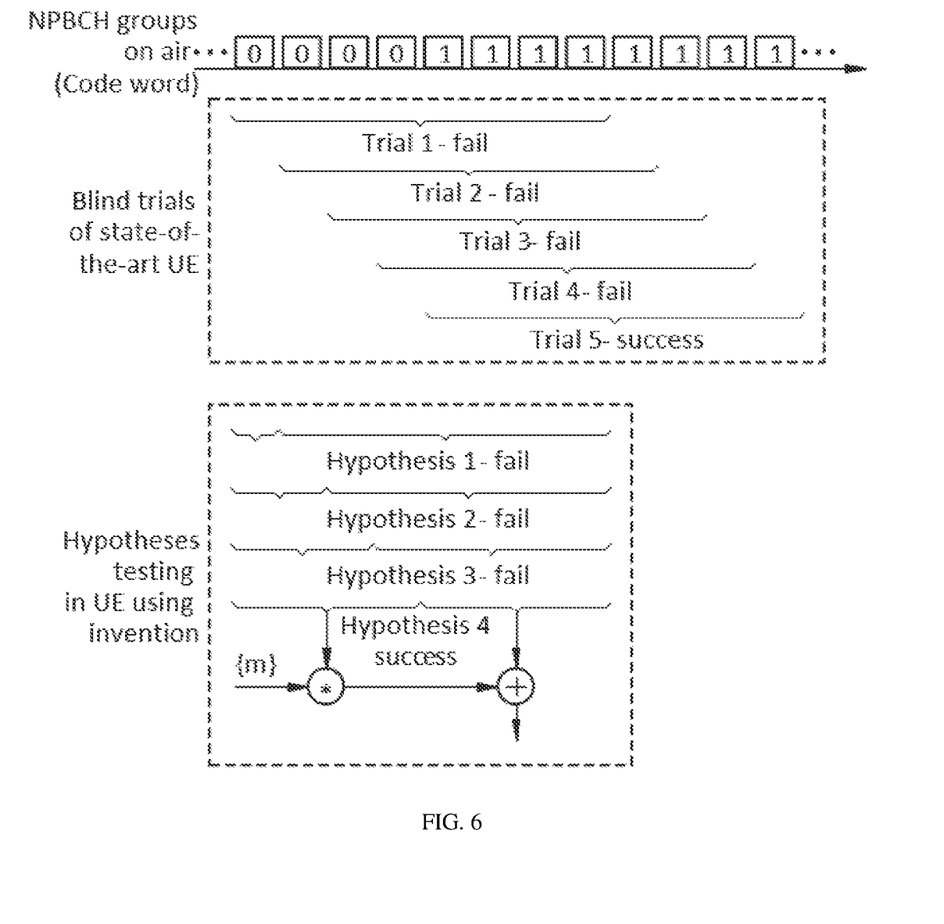
FIG. 6 Sliding window approach of a) a state-of-the-art UE and b) the extended new method for a blind decoding starts in the middle of a NPBCH transmission period.

The combining across SFN+64 hypothesis is already considered during reception of the first group of 64 NPBCH subframes. Usually, the starting point of the group of 64 NPBCH subframes is not known in advance. A state-of-the-art UE receives 8 sets of 8 NPBCH subframes each and tries to decode the combined signal (FIG. 6). If the decoding is not successful, the oldest set is discarded and a new set is received. This sliding window process is repeated until a match is found. Since start of reception is not synchronized with the start of transmission of a set of 8×8 NPBCH subframes, 12 sets must be received on average before a match is found.

A UE implementing the invented scheme (FIG. 6) will try up to 8 hypotheses on the first received 8 sets of 8 NPBCH subframes. Provided that counter in NPBCH code word changes from even to odd, one of the 8 trials will be successful. Hence, NPBCH can be successfully decoded already after reception of 8×8 NPBCH subframes which results in less power consumption. In FIG. 6 the sliding window approach of a state-of-the-art UE (FIG. 6) and the extended new scheme (FIG. 6) are illustrated for an example where blind decoding starts in the middle of a NPBCH transmission period.

What is claimed is:

1. A method for improving reliability of a narrowband physical broadcast channel (NPBCH) reception in narrowband internet-of-things (NB-IoT) user equipment (UE) during a cell acquisition phase, whereas the UE receives one group of 64 encoded NPBCH subframes in order to attach itself to the cell, whereas the one group of 64 NPBCH subframes comprises a first master information block (MIB) comprising cell configuration and cell time information and four most significant bits of a system frame number (SFN), and whereas the four most significant bits of the system frame number are incremented every 64 NPBCH subframes, the method is characterized in that the UE receives, descrambles and de-rate-matches at least a first and a second group of 64 NPBCH subframes, whereas using the four most significant bits of the system frame number as a counter and a modifier sequence {m}, which is applied to the first group of 64 NPBCH subframes, before combining the both groups, decoding and extracting the first MIB from the combined NPBCH subframes and whereas the UE attaches to the cell if a match is found;

wherein the modifier sequence {m} is calculated by performing the following steps:

feeding a second MIB for pre-calculating the modifier sequence {m} with the bits $b_i$=0 with i=0 . . . 33 except for $b_3$=1 to a CRC calculation and attachment procedure, and performing a convolutional encoding procedure, resulting in a sequence {e}, mapping the sequence {e} to the modifier sequence {m} according to $\{m\}=(1-2*e_i)$ with i =1 . . . 33.

2. The method for improving reliability of NPBCH reception according to claim 1, wherein a code word of the first MIB has a standardized form of 34 bits ($b_0$ . . . $b_{33}$) length, whereas the four most significant bits ($b_0$ . . . $b_3$) are defined as four most significant bits of the system frame number used as the counter, whereas whenever the counter gets incremented from an even to an odd number, only the lowest significant bit of the counter b3 changes from 0 to 1, resulting in only one bit toggle.

3. The method for improving reliability of NPBCH reception according to claim 1, wherein the modifier sequence {m} is calculated in advance by using a one bit toggle in the SFN bits and whereas {m} is fixed for a certain communication standard.

4. The method for improving reliability of NPBCH reception according to claim 2, wherein the modifier sequence {m} is calculated in advance by using the one bit toggle in the SFN bits and whereas {m} is fixed for a certain communication standard.

5. The method for improving reliability of NPBCH reception according to claim 1, wherein the modifier sequence {m} is determined analytically using equations for encoding which are defined in the corresponding standard.

6. The method for improving reliability of NPBCH reception according to claim 2, wherein the modifier sequence {m} is determined analytically using equations for encoding which are defined in the corresponding standard.

7. The method for improving reliability of NPBCH reception according to claim 3, wherein the modifier sequence {m} is determined analytically using equations for encoding which are defined in the corresponding standard.

8. The method for improving reliability of NPBCH reception according to claim 4, wherein the modifier sequence {m} is determined analytically using equations for encoding which are defined in the corresponding standard.

9. The method for improving reliability of NPBCH reception according to claim 1, wherein the UE receives up to three groups of 64 NPBCH subframes, denoted as G(j) with j=0, 1, 2 in order to detect the bit toggle in the most significant bits of the system frame number between one of the two groups {G(0), G(1)} or {G(1), G(2)}.

10. The method for improving reliability of NPBCH reception according to claim 2, wherein the UE receives up to three groups of 64 NPBCH subframes, denoted as G(j) with j=0, 1, 2 in order to detect the bit toggle in the most significant bits of the system frame number between one of the two groups {G(0), G(1)} or {G(1), G(2)}.

11. The method for improving reliability of NPBCH reception according to claim 3, wherein the UE receives up to three groups of 64 NPBCH subframes, denoted as G(j) with j=0, 1, 2 in order to detect the bit toggle in the most significant bits of the system frame number between one of the two groups {G(0), G(1)} or {G(1), G(2)}.

12. A method for improving reliability of a narrowband physical broadcast channel (NPBCH) reception in narrowband internet-of-things (NB-IoT) user equipment (UE) during a cell acquisition phase, whereas the UE receives one group of 64 encoded NPBCH subframes in order to attach itself to the cell, whereas the one group of 64 NPBCH subframes comprises a first master information block (MIB) comprising cell configuration and cell time information and four most significant bits of a system frame number (SFN), and whereas the four most significant bits of the system frame number are incremented every 64 NPBCH subframes, the method is characterized in that the UE receives, descrambles and de-rate-matches at least a first and a second group of 64 NPBCH subframes, whereas using the four most significant bits of the system frame number as a counter and a modifier sequence {m}, which is applied to the first group of 64 NPBCH subframes, before combining the both groups, decoding and extracting the first MIB from the combined NPBCH subframes and whereas the UE attaches to the cell if a match is found;
wherein the decoding of the modified first group of 64 NPBCH subframes is already performed during reception of the first group providing that a one bit toggle has occurred.

13. The method for improving reliability of NPBCH reception according to claim 2, wherein the decoding of the modified first group of 64 NPBCH subframes is already performed during reception of the first group providing that the one bit toggle has occurred.

14. The method for improving reliability of NPBCH reception according to claim 1, wherein the first MIB differs by a single increment in a part of a code word of the first MIB that signals cell timing.

15. The method for improving reliability of NPBCH reception according to claim 1, wherein the second MIB contains all zeros but a single one at a position of a least significant bit of cell timing information in the second MIB.

16. The method for improving reliability of NPBCH reception according to claim 1, wherein after immediate receiving, descrambling and de-rate-matching are carried out for the first group of 64 NPBCH subframes and the second group of 64 NPBCH subframes, the de-rate-matched output from the first group of 64 NPBCH subframes is multiplied with the modifier sequence {m} and combined with the de-rate-matched output the second group of 64 NPBCH subframes, then a result is provided to a decoder.

17. The method for improving reliability of NPBCH reception according to claim 12, wherein the modifier sequence {m} is calculated in advance by using the one bit toggle in the SFN bits and whereas the modifier sequence {m} is fixed for a certain communication standard.

18. The method for improving reliability of NPBCH reception according to claim 12, wherein the modifier sequence {m} is calculated by performing the following steps:
feeding a second MIB for pre-calculating the modifier sequence {m} with the bits $b_i=0$ with i=0 ... 33 except for $b_3=1$ to a CRC calculation and attachment procedure, and
performing a convolutional encoding procedure, resulting in a sequence {e},
mapping the sequence {e} to the modifier sequence {m} according to $\{m\}=(1-2*e_i)$ with i =1 ... 33.

19. The method for improving reliability of NPBCH reception according to claim 12, wherein the modifier sequence {m} is determined analytically using equations for encoding which are defined in the corresponding standard.

20. The method for improving reliability of NPBCH reception according to claim 12, wherein the UE receives up to three groups of 64 NPBCH subframes, denoted as G(j) with j=0, 1, 2 in order to detect the bit toggle in the most significant bits of the system frame number between one of the two groups {G(0), G(1)} or {G(1), G(2)}.

* * * * *